July 28, 1970 T. TEMPLE 3,521,942

HIGH FREQUENCY, HIGH VOLTAGE POWER SUPPLY TO ELECTRO-OPTICAL CRYSTAL

Filed Aug. 31, 1967

INVENTOR
TREVOR TEMPLE

BY [signature]

ATTORNEY

United States Patent Office 3,521,942
Patented July 28, 1970

3,521,942
HIGH FREQUENCY, HIGH VOLTAGE POWER SUPPLY TO ELECTRO-OPTICAL CRYSTAL

Trevor Temple, Boulder, Colo., assignor, by mesne assignments, to Alexander Dawson, Inc., Mahwah, N.J., a corporation of Delaware Filed Aug. 31, 1967, Ser. No. 664,860
Int. Cl. G02f *1/28*
U.S. Cl. 350—160 9 Claims

ABSTRACT OF THE DISCLOSURE

A high frequency, high voltage power supply for driving an electro-optical crystal constituting a capacitance in association with a power dissipation factor includes an external shielded coil having a ferrite core and being connected with such capacitance to constitute a series resonant circuit therewith which is driven in a resonant mode by a low voltage switching circuit having transistors used in a switching manner to provide fully conducting or fully open circuits for dissipating very little power and a network of diodes around each transistor to prevent saturation thereof and permit their required high frequency operation.

Figure 2:
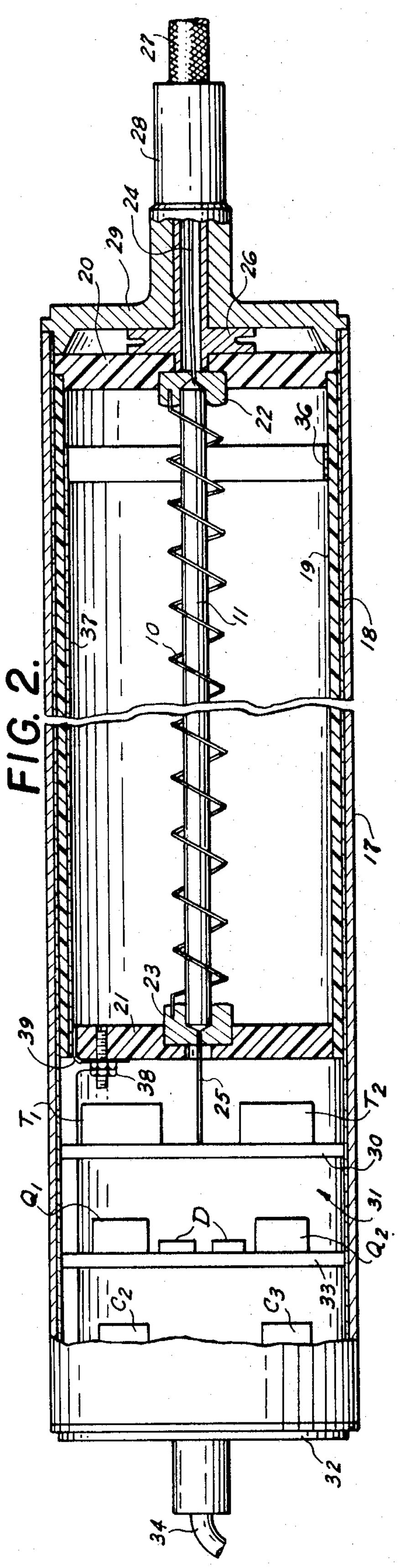

This invention relates generally to an electric power supply capable of supplying a high voltage, high frequency signal to a crystal having the electrical characteristics of a capacitor, and which is particularly adapted for use in producing an electric field across an electro-optical crystal, such as, a KD*P (potassium dihydrogen phosphate preferably enriched with deuterium) crystal or a lithium niobate crystal, so as to vary the crystal's index of refraction, for example, as in the Optical Scanning Apparatus disclosed in the copending U.S. application of John R. Wilson, Jr., Ser. No. 636,077, filed May 4, 1967.

Heretofore, systems for producing a high voltage, high frequency signal have generally comprised a source of regulated, high voltage direct current constituted by a step-up transformer, a rectification bridge, a filter to remove the ripple present in the rectified signal and a voltage stabilizing or regulating stage. The direct current thus produced is fed through a modulating tube or semiconductor capable of handling the power involved, and such tube or semi-conductor is driven by an oscillator at the desired frequencies. If only a single frequency is required, the tube may be placed into a resonant or tank circuit, whereby the power dissipated in the tube is substantially reduced.

Systems as described above are regularly used to provide radio frequency signals for transmission and other purposes. However, such systems are cumbersome, expensive and very inefficient, particularly when called upon to produce signals at megacycle frequencies and with voltages of the order of 4 kv. to 5 kv. as required, for example, for the driving of electro-optical crystals of the type named above.

Accordingly, it is an object of this invention to provide an electric power supply or oscillator which, in association with an electro-optical crystal, is capable of supplying thereto high frequency, high voltage signals, such as, signals at megacycle frequencies and with voltages of the order of 4 kv. to 5 kv., and which is relatively smaller, lighter and less costly and far more efficient than the systems previously provided for that purpose.

A further object is to provide an oscillator capable of supplying high frequency, high voltage signals, for example, for driving electro-optical crystals, and which utilizes relatively low power for its operation.

In accordance with this invention, there is provided a series resonant circuit utilizing an external coil and the capacitance directly associated with an electro-optical crystal which may be considered electrically as constituted by such capacitance associated with a power dissipation factor which, in the case of a KD*P crystal, is approximately 1% or less, such resonant circuit being driven in a resonant mode by a low voltage, semi-conductor switching circuit dissipating very little power.

It is another feature of the invention to provide the low voltage semi-conductor switching circuit with transistors used in a switching manner to provide either fully conducting or fully open circuits, thereby to minimize the power dissipated in the switching circuit, and further to prevent the transistors from saturating, as by a network of diodes provided around each of the transistors, so as to make possible the required switching speed.

Figure 1:
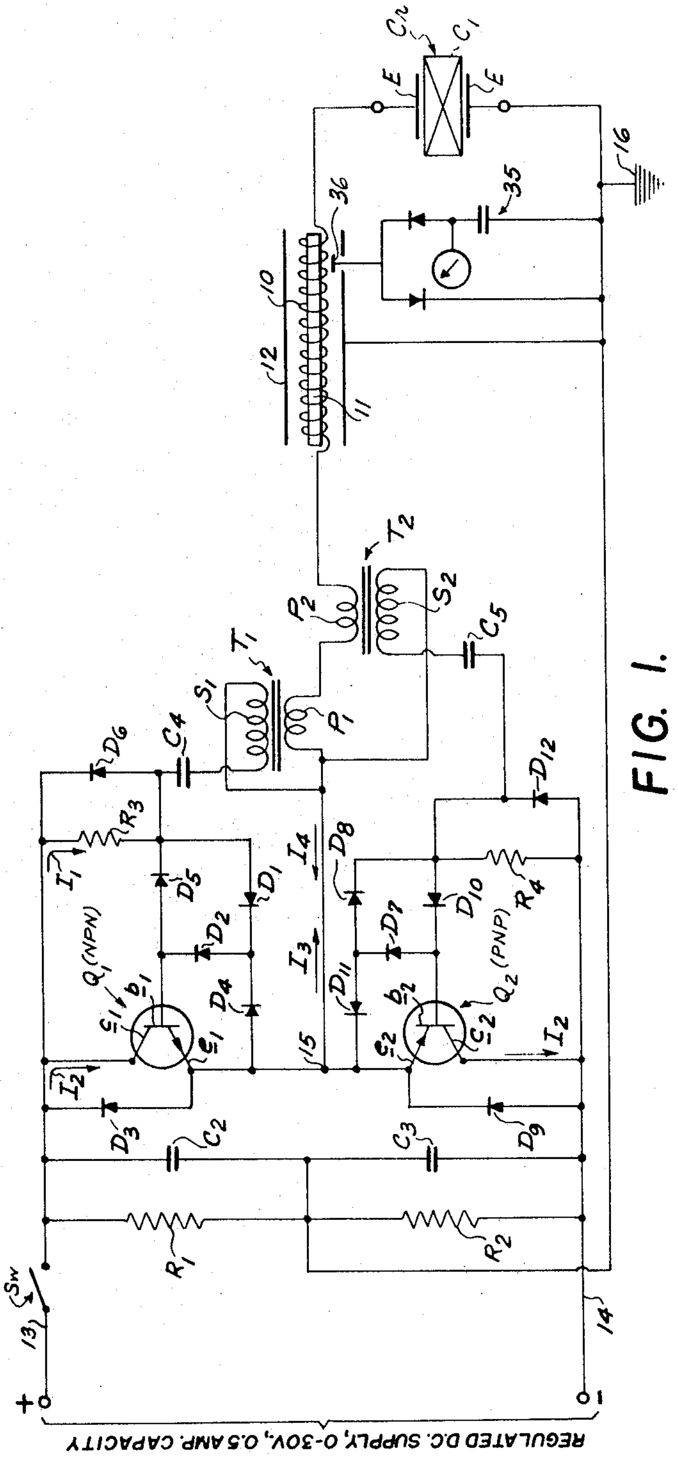

The above, and other objects, features and advantages of the invention, will be apparent in the following detailed description of an illustrative embodiment which is to be read in connection with the accompanying drawings, wherein:

FIG. 1 is a wiring diagram of a high frequency, high voltage electric power supply in accordance with this invention shown associated with an electro-optical crystal for driving the latter; and FIG. 2 is an elevational view, partly broken away and in axial section, of a structural arrangement of the components of the power supply of FIG. 1.

Referring to FIG. 1 in detail, there is represented at *Cr* an electro-optical crystal, for example, a KD*P Z-cut crystal, having suitable electrodes E secured to appropriate crystal faces so that, when a high frequency, high voltage source is connected to such electrodes, the resulting electrical field across the crystal causes corresponding variations in the index of refraction of the crystal, for example, for the purpose of changing the phase of incident monochromatic light in a beam deflection system as disclosed in U.S. application Ser. No. 636,077 which is identified more fully above. For the foregoing purpose, it is necessary that the power supply or source connected to electrodes E for driving crystal *Cr* be capable of producing voltages of the order of 4 kv. to 5 kv. at megacycle frequencies.

A KD*P crystal presents a high impedance to a megacycle or 1 mHz. source, such impedance being approximately 500 K-j. 5000 ohms. Further, the electrical nature of the crystal is a capacitance represented at $C_1$ of the order of 10 to 50 picofarads associated with a power dissipation factor which, in the case of a KD*P crystal, is approximately 1% or less.

In accordance with this invention, the capacitance $C_1$ of the crystal *Cr* is connected with a coil 10 having a ferrite core 11 and being shielded, as at 12, to form a series resonant circuit. Although the KD*P crystal presents a high impedance to a megacycle source, the shielded, ferrite cored coil 10 is designed to constitute a quarter wave line when loaded by the crystal, thereby to transform such high impedance to a low resistance, for example, of approximately 50 ohms. Since the quarter wave line can be and is designed to have low losses, the series resonant circuit constituted by coil 10 and capacitance $C_1$ is adapted to be driven in a resonant mode by a low voltage, semi-conductor switching circuit which, in itself, dissipates very little power.

The switching circuit in accordance with this invention generally comprises an NPN transistor $Q_1$ having the usual base $b_1$, collector $c_1$ and emitter $e_1$ and a PNP transistor $Q_2$ having a base $b_2$, collector $c_2$ and emitter $e_2$ and being paired with transistor $Q_1$ in a complementary configuration. Current drive of the quarter wave line is effected by the switching circuit through current transformers $T_1$ and $T_2$ having primary windings $P_1$ and $P_2$ and secondary windings $S_1$ and $S_2$.

Since the power required to drive the crystal *Cr* is approximately 6 watts and the drive for the crystal in accordance with this invention has a high efficiency, such drive requires only a relatively small D.C. power supply connected to a positive bus 13 and a negative bus 14. A 0–30 v. D.C. output with an 0.5 amp. capacity is adequate, and such D.C. power supply should have a well regulated, low ripple output to prevent modulation of the 1.0 mHz. output voltage for driving the crystal.

A control power circuit runs directly from a center tap 15 between the emitters of transistors $Q_1$ and $Q_2$ through primary windings $P_1$ and $P_2$ and through the series resonant circuit made up of shielded, ferrite cored coil 10 and crystal *Cr* to to a ground 16. Capacitors $C_2$ and $C_3$ maintain the D.C. power supply leads or buses 13 and 14 at A.C. ground potential. Also connected across the D.C. power supply are resistors $R_1$ and $R_2$ having a center tap to ground 16 and cooperating with capacitors $C_2$ and $C_3$ to form an RC divider across the output providing a center tap ground for yielding equal plus and minus voltages. The resistors $R_1$ and $R_2$ maintain a D.C. balance across capacitors $C_2$ and $C_3$ and, although not essential for operability, such resistors do contribute to improved operational characteristics.

A switch *Sw* is interposed in positive bus 13 and the latter is connected through a resistor $R_3$ and diodes $D_1$ and $D_2$ to base $b_1$ of transistor $Q_1$ which has its collector $c_1$ directly connected to a positive bus 13. A path for reverse current is provided from center tap 15 to positive bus 13 through a diode $D_3$. Diodes $D_4$ and $D_5$ are respectively provided to conduct from center tap 15 to diode $D_2$ and from the latter to the positive bus by way of a diode $D_6$ shunting resistor $R_1$. The secondary winding $S_1$ of transformer $T_1$ is connected, at one end, to center tap 15 and, at its other end, through a capacitor $C_4$ to diodes $D_1$ and $D_6$, and winding $S_1$ is wound so that a current flowing in one direction through primary winding $P_1$ induces a current in the opposite direction in the secondary winding for positive feedback to the base circuit of transistor $Q_1$.

The base $b_2$ of transistor $Q_2$ is connected through diodes $D_7$ and $D_8$ and a resistor $R_4$ to negative bus 14, while the collector $c_2$ of transistor $Q_2$ is directly connected to the negative bus. A path for reverse current is provided from negative bus 14 to center tap 15 through a diode $D_9$. Diodes $D_{10}$ and $D_{11}$ are respectively provided to conduct from a diode $D_{12}$ shunting resistor $R_4$ to diode $D_7$ and from the latter to center tap 15. The secondary winding $S_2$ of transformer $T_2$ is connected, at one end, to center tap 15 and, at its other end, to the base circuit of transistor $Q_2$ by way of a capacitor $C_5$.

The diodes $D_3$, $D_6$, $D_9$ and $D_{12}$ may be of the type identified as FD–600, and all of the other diodes may be of the type identified as IN4009. The transistors $Q_1$ and $Q_2$ may be of the type identified as 2N3725 and 2N3503, respectively. Further, the current transformers $T_1$ and $T_2$ may each have a turns ratio of 1:7 between their primary and secondary windings which must have a tight coupling at 1.0 mHz.

The above described circuit operates as follows:

Upon closure of switch *Sw*, an initial current $I_1$ flows from positive D.C. supply bus 13 through resistor $R_3$, diodes $D_1$ and $D_2$, the base and the emitter diode portion of NPN transistor $Q_1$, the emitter and base diode portion of PNP transistor $Q_2$, diodes $D_7$ and $D_8$, and resistor $R_4$ to negative D.C. supply bus 14. Such initial current $I_1$ in the path indicated is initiated immediately upon closing of start switch *Sw*. As soon as the described base to emitter and emitter to base current flows are initiated in transistors $Q_1$ and $Q_2$, respectively, a circuit is established for a current flow $I_2$ from positive bus 13 through the collector-emitter of transistor $Q_1$, and through the emitter-collector of transistor $Q_2$ to negative bus 14. The current $I_2$, which is small compared to the normal operating currents that will flow through transistors $Q_1$ and $Q_2$, places both transistors in a state of high gain and effectively renders the transistors potentially unstable. Since transistors $Q_1$ and $Q_2$ are in a high gain and potentially unstable state, the available positive feedback paths effect a progressive buildup of an oscillatory current flow and eventually result in the circuit oscillating at its natural frequency.

The oscillatory circuit flow is initiated, for example, by random noise characteristics or other factors, and for the purpose of this explanation is assumed to be initiated by a very small current $I_3$ in the direction indicated. The flow of current $I_3$ in primary winding $P_1$ of transformer $T_1$ causes a current to flow in secondary winding $S_1$ in the opposite direction and with a magnitude determined by the turns ratio of the windings. Such current induced in windings $S_1$ flows through capacitor $C_4$, diodes $D_1$ and $D_2$ and the base to emitter diode portions of transistor $Q_1$ to increase the conduction of the latter. The same current $I_3$ flowing through primary winding $P_2$ of transformer $T_2$ causes a current to flow in the opposite direction in secondary winding $S_2$ through capacitor $C_5$ and diode $D_{10}$ and through the base to emitter diode portion of transistor $Q_2$ in the direction opposed to the direction of normal current flow $I_2$ therethrough, thereby causing transistor $Q_2$ to be abruptly shut off. The abrupt shut off of transistor $Q_2$ coupled with the increased conduction of transistor $Q_1$, and hence the increased current flow through the latter, results in an increase in the magnitude of current $I_3$. Further, the cessation of current flow through transistor $Q_2$ causes the current produced in secondary winding $S_2$ by the current $I_3$ to be bypassed around transistor $Q_2$ through diodes $D_{10}$, $D_7$ and $D_{11}$, thereby maintaining a reverse voltage across the base to emitter diode portion of transistor $Q_2$ for keeping the latter in its shut off condition.

As the current $I_3$ builds up and flows through the series resonant circuit, energy is stored in coil 10 and capacitance $C_1$ represented by the crystal, and the capacitance $C_1$ charges with a concomitant buildup of a counter EMF to progressively decrease the magnitude of current $I_3$. After the current $I_3$ decays to 0 by reason of the counter EMF developed at capacitance $C_1$, the energy stored in the latter effects a reversal of the direction of current flow to that indicated by the arrow $I_4$. Transistor $Q_1$ can no longer act as a path for the reversed current $I_4$ and the latter flows through diode $D_3$ back to the positive bus 13.

The current $I_4$ also reverses the direction of current flow in secondary windings $S_1$ and $S_2$ of transformers $T_1$ and $T_2$ so that the states of transistors $Q_1$ and $Q_2$ are reversed. Thus, transistor $Q_1$ is shut off and the current flow is bypassed through diodes $D_4$, $D_2$, $D_5$ and $D_6$, and transistor $Q_2$ is turned on or rendered conductive with a current flowing therefrom through diodes $D_7$ and $D_8$. The current $I_4$ builds up and is augmented by the transistor $Q_2$ providing a reduced resistance path to negative bus 14 so that current $I_4$ rises to a value higher than the peak value of the previous current $I_3$. Of course, as the current $I_4$ increases, the capacitance $C_1$ is being charged and develops a counter EMF which causes decay of current $I_4$ and eventually the reversal of the circuit to the condition described above with respect to the current $I_3$.

Such cycling continues with incremental build-up of the successive currents $I_3$ and $I_4$ until transistors $Q_1$ and $Q_2$ approach a condition where the circuit saturates. However, in order to improve the switching capabilities of transistors $Q_1$ and $Q_2$, that is, to ensure that the transistors will be converted from the fully conductive state to the fully shut off state at the required speeds, it is necessary that saturation of the transistors be avoided. In the described circuit, this is achieved by the networks of diodes provided around the transistors. Thus, in the case of transistor $Q_1$, the base drive current therefor can flow through the two diodes $D_1$ and $D_2$, each having a voltage drop thereacross, and through the base to emitter of the transistor. A second path for the base drive current of transistor $Q_1$ is provided to the collector $c_1$ thereof through diode $D_6$. When the collector to emitter voltage of transistor $Q_1$ falls below the voltage drop across diodes $D_1$ and $D_2$, current from secondary winding $S_1$ through capacitor $C_4$ has an alternate path through diode $D_6$ to collector $c_1$, thus limiting the minimum collector to emitter voltage of transistor $Q_1$ to a value at which the transistor remains unsaturated.

Similarly, in the case of transistor $Q_2$, the base drive current therefor can flow through the emitter to base thereof and through diodes $D_7$ and $D_8$, each providing a voltage drop, and an alternative or second path for the base drive current is provided from collector $c_2$ through diode $D_{12}$. Thus, when the emitter to collector voltage of transistor $Q_2$ falls below the voltage drop across diodes $D_7$ and $D_8$, current to secondary winding $S_2$ through capacitor $C_5$ has an alternate path through diode $D_{12}$, thereby limiting the minimum emitter to collector voltage of transistor $Q_2$ to a value at which that transistor remains unsaturated.

Referring now to FIG. 2, it will be seen that the components of the circuit embodying this invention, as described above with reference to FIG. 1, may be compactly housed in a tubular casing 17, for example, of brass, having its inner surface silver plated, as at 18, for RF shielding. A plastic sleeve 19, for example, of methyl methacrylate, is disposed within a substantial portion of the length of casing 17 and has its opposite ends closed by plates 20 and 21 which may be of the same plastic. End plates 20 and 21 have core inserts 22 and 23, for example, of brass, mounted centrally therein to receive and support the opposite ends of ferrite core 11 on which coil 10 is wound. The ends of coil 10 are connected with core inserts 22 and 23 which have wire leads 24 and 25 extending therefrom. Wire lead 24 extends through a lead bushing 26 for connection to a high voltage coaxial line 27, as by a suitable fitting 28 on a cap 29 at one end of casing 17. The line 27 is suitably connected to the electro-optical crystal Cr shown on FIG. 1.

The wire lead 25 extends through end plate 21 for connection to transformers $T_1$ and $T_2$ mounted on a support 30 within a compartment 31 defined in casing 17 between plate 21 and a cap 32 at the end of the casing remote from end cap 29. Additional supports 33 are disposed in compartment 31 to carry the switching transistors $Q_1$ and $Q_2$ and associated diodes indicated at D and also to carry the capacitors $C_2$ and $C_3$ of the center tap. An input cable 34 connects to end cap 32 to supply the low D.C. voltage for powering the unit.

As shown on FIG. 1, a test current circuit 35 may also be provided to indicate when a satisfactory high voltage, high frequency signal is being supplied to crystal Cr. Such test current circuit includes a detector 36 which, as shown on FIG. 2, may be conveniently provided by a stripe of silver paint extending circumferentially on the inner surface of plastic sleeve 19. The connection to detector 36 may be provided by a stripe 37 of silver paint extending longitudinally along the inner surface of sleeve 19 from stripe 36 to the end of the sleeve which is closed by end plate 21, and by a terminal post 38 which is carried by end plate 21 and electrically connected to stripe 37, as by a silver paint stripe 39 which extends radially outward from post 38 and then over the edge of plate 21 for contact with stripe 37.

A high frequency, high voltage power supply in accordance with this invention utilizes a total power of approximately 6 watts while developing the necessary 4K to 5K voltage at 1 megacycle, whereas previously existing systems had to have built thereinto a total power of the order of 250 watts for the same purpose. Such an existing system weighed on the order of 200 pounds, whereas the circuits embodying this invention, when enclosed as shown on FIG. 2, have a weight of approximately 1½ pounds. Further, a tremendous reduction in cost is involved, as the circuits embodying this invention can be produced for approximately $\frac{1}{50}$ of the cost of the previously existing systems. The foregoing advantages result, at least in part, from the fact that a series resonant circuit is provided by the coil 10 and by the capacitance of the crystal to be driven, which resonant circuit is driven in a resonant mode by a low voltage, semiconductor switching circuit dissipating very little power.

Although an illustrative embodiment of the invention has been described in detail herein with reference to the accompanying drawing, it is to be understood that the invention is not limited to that precise embodiment, and that various changes and modifications can be effected therein by one skilled in the art without departing from the scope or spirit of the invention as defined in the appended claims.

What is claimed is:

1. In combination with a crystal possessing the electrical characteristics of a capacitor, an oscillator for supplying a high frequency, high voltage signal to said crystal and comprising a coil connected to said crystal to constitute a resonant circuit therewith, and a semi-conductor switching circuit energizable by a source of relatively low D.C. voltage and being operative to drive said resonant circuit in a resonant mode thereof.

2. The combination according to claim 1 in which said coil is ferrite cored and shielded to constitute a quarter wave line when loaded by said crystal possessing the electrical characteristics of a capacitor.

3. The combination according to claim 1; in which said switching circuit includes NPN and PNP transistors paired in a complementary configuration so as to be alternately in their conducting and shut-off states, and current for driving said resonant circuit is transmitted through primary windings of current transformers having their secondary windings connected respectively to base circuits of said transistors with such polarity as to provide positive feedback thereto.

4. The combination according to claim 3; in which said switching circuit further includes means to prevent saturation of said transistors, thereby to permit high frequency operation of said transistors in a switching manner.

5. The combination according to claim 4; in which said means to prevent saturation of the transistors includes, for each of said transistors, two diodes interposed in series between the base of the transistor and said secondary winding of the respective transformer and a single diode providing an alternate path for current between the collector of the transistor and said secondary winding in the event that the collector-emitter voltage of the transistor falls below the voltage drop of said two diodes.

6. The combination according to claim 3; further comprising an RC divider across the input of said switching circuit providing a center tap ground for yielding substantially equal plus and minus voltages.

7. The combination according to claim 1; in which said crystal possessing the electrical characteristics of a capacitor is an electro-optical crystal.

8. The combination with a crystal possessing the electrical characteristics of a capacitor, means for driving said crystal by a signal of high frequency and voltage which comprises a ferrite cored, shielded coil connected with said crystal possessing the electrical characteristics of a capacitor to form a quarter wave line when loaded by the latter and to constitute a resonant circuit therewith, positive and negative buses for connection to a source of relatively low D.C. voltage, an NPN transistor and a PNP transistor having their collectors connected to said positive and negative buses, respectively, and their emitters connected to each other at a center tap, first and second current transformers having their primary windings connected in series between said center tap and said coil and their secondary windings connected respectively to base circuits of said NPN and PNP transistors with such polarity as to provide positive feedback thereto, two diodes in series in the base circuit of each of said transistors between the base of the respective transistor and said secondary winding of the respective transformer and a single diode providing an alternate current path between said secondary winding and the collector of the respective transistor to prevent saturation of the later, and an RC divider across said positive and negative buses providing a center tap ground for yielding substantially equal plus and minus voltages.

9. The combination according to claim 8; in which said crystal possessing the electrical characteristics of a capacitor is an electro-optical crystal.

References Cited

UNITED STATES PATENTS 3,429,636 2/1969 Wentz.

RONALD L. WIBERT, Primary Examiner

P. K. GOODWIN, JR., Assistant Examiner

U.S. Cl. X.R.

320—1; 331—108, 113